(12) United States Patent
Ford

(10) Patent No.: US 10,493,958 B2
(45) Date of Patent: Dec. 3, 2019

(54) VEHICLE WINDSHIELD WIPER ASSEMBLY FILTER

(71) Applicant: Nissan North America, Inc., Franklin, TN (US)

(72) Inventor: Sarah Ford, Linden, MI (US)

(73) Assignee: Nissan North America, Inc., Franklin, TN (US)

( * ) Notice: Subject to any disclaimer, the term of this patent is extended or adjusted under 35 U.S.C. 154(b) by 223 days.

(21) Appl. No.: 15/628,801

(22) Filed: Jun. 21, 2017

(65) Prior Publication Data
US 2018/0370490 A1 Dec. 27, 2018

(51) Int. Cl.
B60S 1/04 (2006.01)
B60S 1/08 (2006.01)
B60S 1/34 (2006.01)

(52) U.S. Cl.
CPC .............. B60S 1/0491 (2013.01); B60S 1/08 (2013.01); B60S 1/349 (2013.01); B60S 1/0433 (2013.01); B60S 1/0441 (2013.01); B60S 1/0463 (2013.01)

(58) Field of Classification Search
CPC ...... B60S 1/043; B60S 1/0436; B60S 1/0438; B60S 1/0441; B60S 1/0463; B60S 1/3493; B60S 1/0433; B60S 1/0491; B60S 1/08; B60S 1/06; B60S 1/349; B60R 13/07

USPC .... 15/250.3, 250.31; 296/96.15, 96.17, 192; 277/634, 637, 644
See application file for complete search history.

(56) References Cited

U.S. PATENT DOCUMENTS

| 6,318,735 | B1 * | 11/2001 | Lambeth | B60S 1/34 15/250.31 |
| 7,222,386 | B2 * | 5/2007 | Nakamura | B60S 1/0425 15/250.3 |
| 2009/0094773 | A1 * | 4/2009 | Hasegawa | B60S 1/245 15/250.27 |
| 2017/0174184 | A1 * | 6/2017 | Yotsunaga | B60S 1/3493 |

FOREIGN PATENT DOCUMENTS

| JP | 2000-085541 A | | 3/2000 |
| JP | 2004-17894 | * | 1/2004 |
| JP | 2005-324710 | * | 11/2005 |
| WO | 2007-110382 A1 | | 10/2007 |
| WO | 2016-110390 A1 | | 7/2016 |

* cited by examiner

Primary Examiner — Gary K. Graham
(74) Attorney, Agent, or Firm — Global IP Counselors, LLP

(57) ABSTRACT

A vehicle windshield wiper assembly includes a filter member. The filter member is mounted to a radially inwardly facing surface of an upper area of a cylindrically shaped portion of a water diverting member below portions of a support panel above a wiper drive mechanism. The filter member encircles a shaft housing of the wiper drive mechanism and is shaped and dimensioned to allow flow of water from a first shaft opening in the support panel therethrough and restrict flow of debris from the first shaft opening therethrough.

10 Claims, 6 Drawing Sheets

VEHICLE WINDSHIELD WIPER ASSEMBLY
FILTER

BACKGROUND

Field of the Invention

The present invention generally relates to a vehicle windshield wiper assembly filter. More specifically, the present invention relates to a vehicle windshield wiper assembly filter where a filter member encircles a shaft support portion of a windshield wiper arm and allows the flow of water therethrough, but restricts debris from flowing therethrough.

Background Information

The cowl area of a vehicle at the base of a windshield of the vehicle typically includes an air intake vent that provides fresh air into an air intake box, which in turn provides the fresh air into the passenger compartment of the vehicle. A windshield wiper assembly is often installed to structure above the air intake box. Due to its location at the base of a windshield, water can enter the air intake box. However, the air intake box typically includes a drain allowing such water to drain out of the air intake box.

SUMMARY

One object of the present disclosure is to limit or prevent the ingress of debris into an area above an air intake box of a vehicle.

In view of the state of the known technology, one aspect of the present disclosure, is to provide a vehicle windshield wiper assembly with a vehicle body structure, a support panel, a wiper drive mechanism, a water diverting member and a filter member. The vehicle body structure defines a windshield opening and a wiper drive receiving area beneath the windshield opening. The support panel is adjacent to the windshield opening. The support panel has an upper surface and a lower surface with a first shaft opening extending from the upper surface to the lower surface. The wiper drive mechanism is supported to the vehicle body structure and extends along the lower surface of the support panel. The wiper drive mechanism includes a shaft housing and a wiper shaft pivotally supported within the shaft housing. The water diverting member at least partially covers a portion of the wiper drive mechanism, encircling the shaft housing and being attached thereto. The water diverting member has a cylindrically shaped portion extending upward therefrom. The cylindrically shaped portion defines a second shaft opening with the shaft housing and wiper shaft extending upward through the second shaft opening and further extends upward through the first shaft opening. The filter member is mounted to a radially inwardly facing surface of an upper area of the cylindrically shaped portion of the water diverting member and below portions of the support panel. The filter member encircles the shaft housing and is shaped and dimensioned to allow flow of water from the first shaft opening therethrough and restrict flow of debris from the first shaft opening therethrough.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
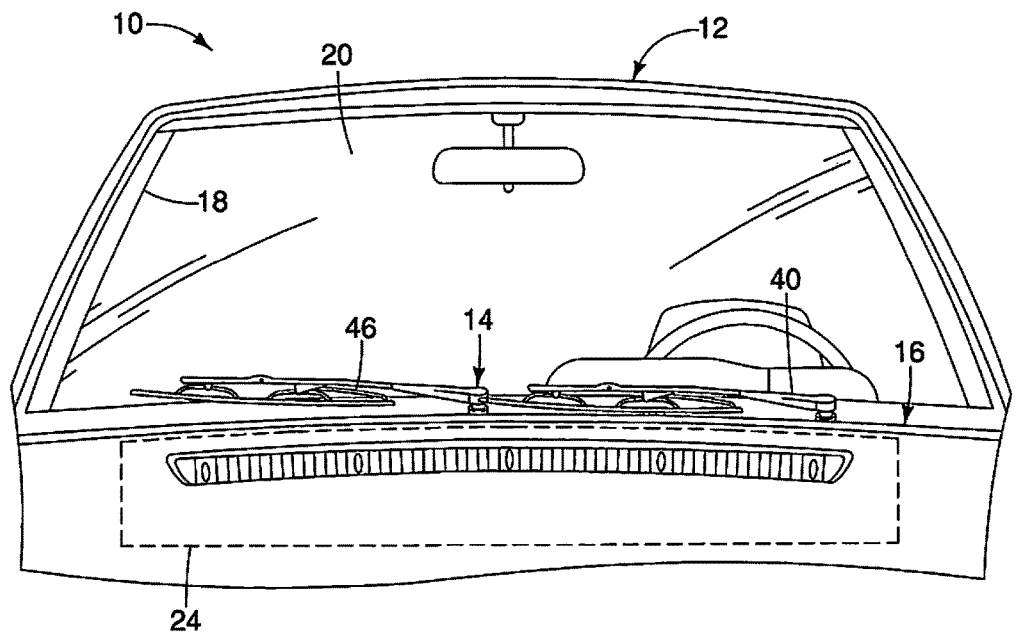
FIG. 1 is a front view of a vehicle showing a windscreen and a cowl area beneath the windscreen, the cowl area including a wiper drive mechanism in accordance with a first embodiment.

Referring initially to FIG. 1, a vehicle 10 that includes a vehicle body structure 12 having a wiper drive mechanism 14 is illustrated in accordance with a first embodiment.

The vehicle body structure 12 includes a cowl area 16 located adjacent to a windshield opening 18 having a windscreen 20. As shown in FIG. 1, within the vehicle body structure 12 beneath the cowl area 16 and the wiper drive mechanism 14, there is an air intake box 24 that is part of an air conditioning system (not shown). The air intake box 24 is configured to draw fresh air from outside the vehicle 10 and direct the fresh air into the passenger compartment of the vehicle 10 in a conventional manner. Due to its location, the air intake box 24 typically receives rain water and is provided with a drain (not shown) such that water can drain out of the air intake box 24 in a conventional manner. Since air intake boxes and air conditioning systems of vehicles are convention structures, further description is omitted for the sake of brevity.

Figure 2:
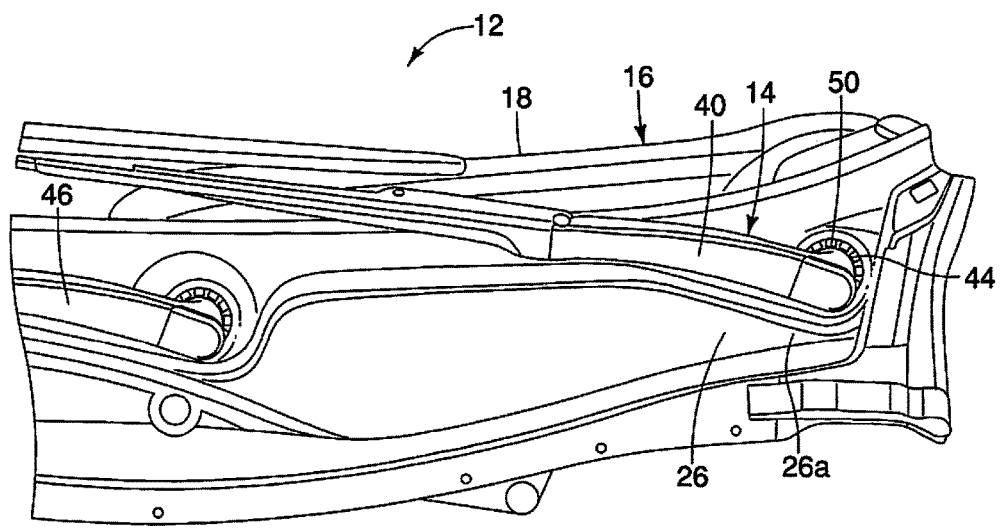
FIG. 2 is a perspective view of the cowl area of the vehicle showing a support panel and elements of the wiper drive mechanism including a filter member in accordance with the first embodiment.

As shown in FIG. 2, within area of the cowl area 16, the vehicle body structure 12 includes a support panel 26 that is located adjacent to the windshield opening 18. The support panel 26 includes an upper surface 26a (FIGS. 2 and 4), and a lower surface 26b (FIG. 4) with a first shaft opening 26c extending from the upper surface 26a to the lower surface 26b.

Figure 3:
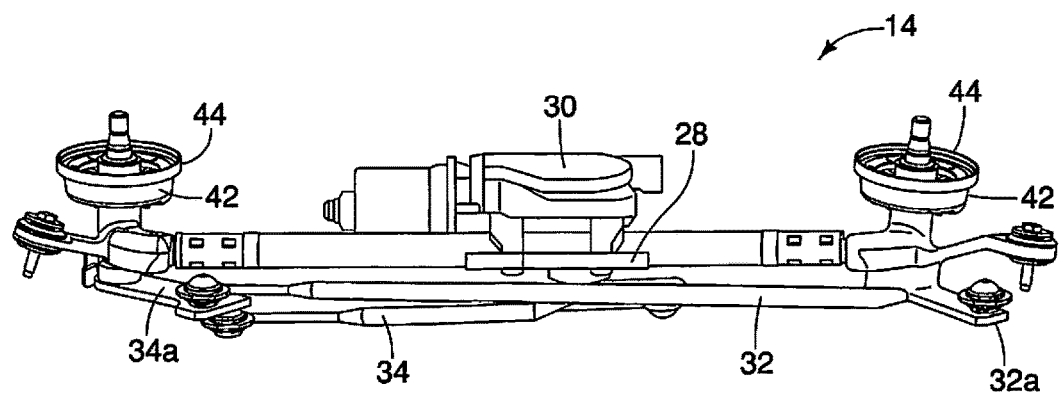
FIG. 3 is a perspective view of the wiper drive mechanism shown removed from the vehicle revealing a water diverting member and the filter member in accordance with the first embodiment.

A description of the wiper drive mechanism 14 is now provided with specific reference to FIG. 3, which shows the wiper drive mechanism 14 removed from the vehicle body structure 12. The wiper drive mechanism 14 includes a base bracket 28, a motor 30, linkage members 32 and 34, a first shaft housing 36 (FIG. 4), a first wiper shaft 38 (FIG. 4), a first wiper arm 40 (FIG. 2) attached to the first wiper shaft 38, a water diverting member 42 and a filter member 44.

The wiper shaft drive mechanism 14 also includes a second wiper arm 46 (FIG. 1) that is supported on the wiper shaft mechanism 14 via a second shaft housing (not shown) and a second wiper shaft that are essentially structurally the same as the first shaft housing 36 and the first wiper shaft 38. A second water diverting member 42' is located beneath the second wiper arm 46 and serves the same purpose as the water diverting member 42. The description of the water diverting member 42 (provided below) applies equally to the second water diverting member 42'. Therefore, further description of the second water diverting member 42' is omitted for the sake of brevity.

The motor 30 and the first shaft housing 36 are rigidly connected to the base bracket 28 in a conventional manner. The base bracket 28 of the wiper drive mechanism 14 is fixedly attached to the vehicle body structure 12 at any of a variety of locations (not shown) in a conventional manner. For example, the wiper drive mechanism 14 can be fastened to the support panel 26, and/or other panels (not shown) of the vehicle body structure 12. Since attachment structures of wiper drive mechanisms are conventional vehicle features, further description is omitted for the sake of brevity.

As shown in FIG. 3, the linkage member 32 connects the motor 30 to the first wiper arm 40 in a conventional manner such that operation of the motor 30 causes pivoting movement of the first wiper arm 40. Specifically, the linkage member 32 is pivotally attached to a lever plate 32a. The first wiper shaft 38 extends through the lever plate 32a and is fixedly attached thereto for pivoting movement therewith in a conventional manner. The linkage member 34 connects a lever plate 34a with the second wiper arm 46 in order to move the second wiper arm 46 in synchronously along the windscreen 20 with the first wiper arm 40 in order to wipe rain water therefrom in a conventional manner. Since the structures of wiper drive mechanisms are conventional vehicle features, further description is omitted for the sake of brevity.

Figure 4:
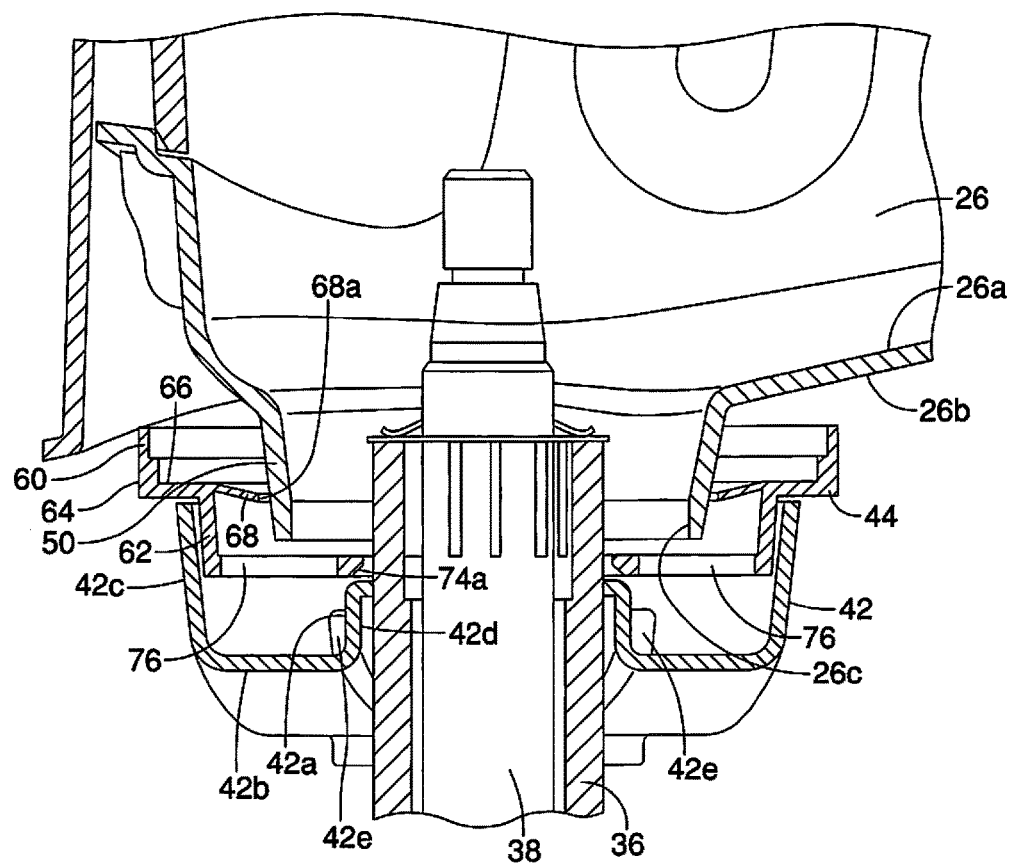
FIG. 4 is a cross sectional view of the water diverting member, the filter member and a portion of the wiper drive mechanism in accordance with the first embodiment.
Figure 5:
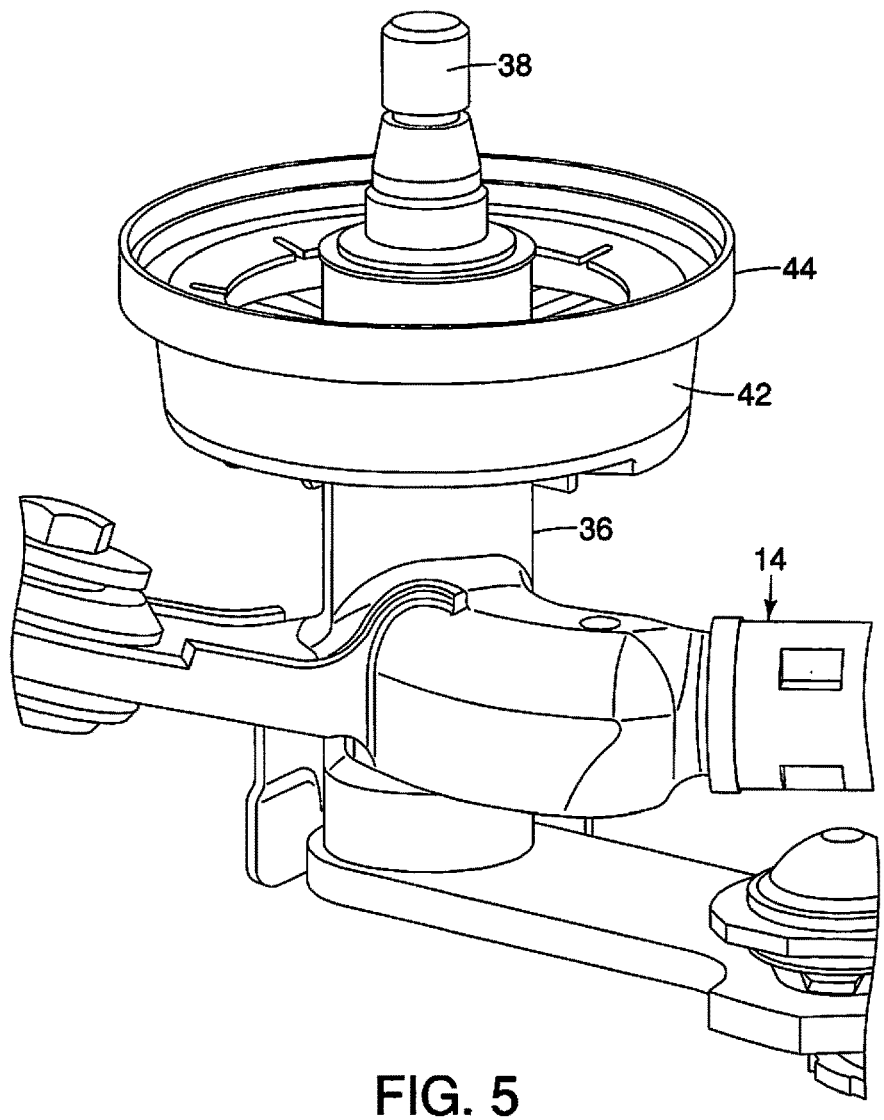
FIG. 5 is a perspective view of the water diverting member, the filter member and the portion of the wiper drive mechanism in accordance with the first embodiment.

As shown in FIG. 4, the wiper drive mechanism 14 extends along and below the lower surface 26b of the support panel 26. As also shown in FIG. 4, the support panel 26 includes a cylindrically shaped projection 50 that extends downward from the lower surface 26b of the support panel 26. Further, the first shaft opening 26c is defined at a bottom end of the cylindrically shaped protrusion 50. As shown in FIGS. 2 and 4, the inner diameter of the cylindrically shaped protrusion 50 is sufficiently large so as to reveal a radially inward portion of the filter member 44. In FIGS. 3 and 5, the support panel 26 is removed revealing the filter member 44 and the water diverting member 42.

The water diverting member 42 is a separate element that is installed to the first shaft housing 36. The water diverting member 42 is a protective element that is dimensioned to partially cover adjacent portion of the wiper drive mechanism 14, preventing water from flowing onto the wiper drive mechanism 14. Specifically, the water diverting member 42 is shaped and dimensioned to divert water falling through the first shaft opening 26c of the support panel 26 away from the elements of the wiper drive mechanism 14 below the water diverting member 42, and forward away from the windscreen 20, and/or into the air intake box 24.

The water diverting member 42 has an overall cup-like shape, and is installed directly to the first shaft housing 36, as shown in FIG. 4. The water diverting member 42 basically includes a cylindrical portion 42a, a bottom wall 42b and a conical shaped portion 42c. The cylindrical portion 42a is dimensioned such that the cylindrical portion 42a encircles the shaft housing 36 and is attached thereto via a conventional snap-fit connection a force fit connection. The cylindrical portion 42a has an overall diameter that is smaller than the diameters of the conical shaped portion 42c. The bottom wall 42b extends from the cylindrical portion 42a to the conical shaped portion 42c, thereby defining the above-mentioned cup-like shape. The conical shaped portion 42c extends upward from a radially outward end of the bottom wall 42b. A narrower end of the conical shaped portion 42c is formed with or joined to the bottom wall 42b such that the overall diameter of the conical shaped portion 42c increases moving upward. The increase in diameter of the conical shaped portion 42c is slight. Therefore, the conical shaped portion 42c resembles a cylindrical shape and is also referred to herein below as cylindrically shaped portion of the water diverting member 42 that extends upward therefrom. The cylindrical portion 42a further defines a second shaft opening 42d with the shaft housing 36 and the wiper shaft 38 extending upward through the second shaft opening 42d and further extending upward through the first shaft opening 26c. The conical shaped portion 42c further includes a plurality of water draining openings 42e (only two drain holes are visible in FIG. 4).

The water diverting member 42 is pitched or inclined forward relative to the vehicle 10. FIG. 4 is a view from above, looking downward from the vicinity of the windshield opening 18. As is describe further below, the filter member 44 is installed to the conical shaped portion 42c of the water diverting member 42 and below the support panel 26. The filter member 44 encircles the cylindrical portion 42a and is shaped and dimensioned to allow flow of water from the first shaft opening 26c through the filter member 44 but restrict flow of debris from the first shaft opening 26c to the bottom wall 42b of the water diverting member 42.

It should be understood from the drawings and the description herein that there are two filter members 44. The first of the two filter members 44 is located as described above and on the water diverting member 42. The other filter member 44 is installed to the second water diverting member 42' beneath the second wiper arm 46 providing debris restriction. Since the filter members 44 are identical, description of one applies equally to both. Therefore, description of only one of the filter members 44 is provided below for the sake of brevity.

A description of the filter member 44 is now provided with reference to FIGS. 4-12. The filter member 44 has an overall annular disk-shape with that includes a first portion 60 and a second portion 62.

The first portion 60 defines a first outer annular surface 64 having a first outer diameter $DO_1$. The first portion 60 includes an annular step portion 66 that extends from a lower end of the first portion 60 to an upper end 62a of the second portion 60. The annular step portion 66 defines a planar surface 66a. The first portion 60 further has a first radially inwardly extending portion 68 that defines an inner annular edge 68a having a first inner diameter $DI_1$.

Figure 7:
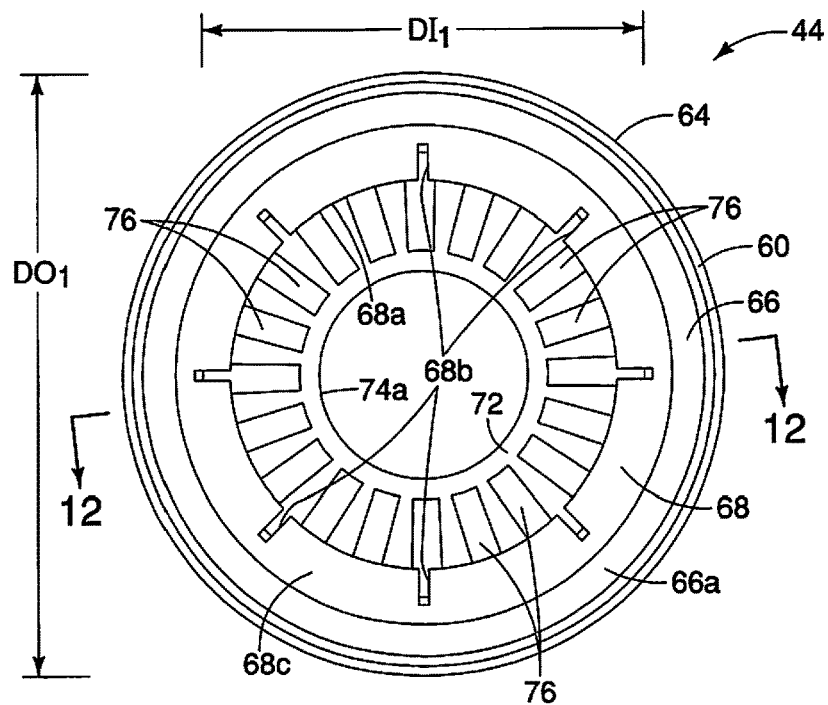
FIG. 7 is a top view of the filter member shown removed from the vehicle in accordance with the first embodiment.
Figure 9:
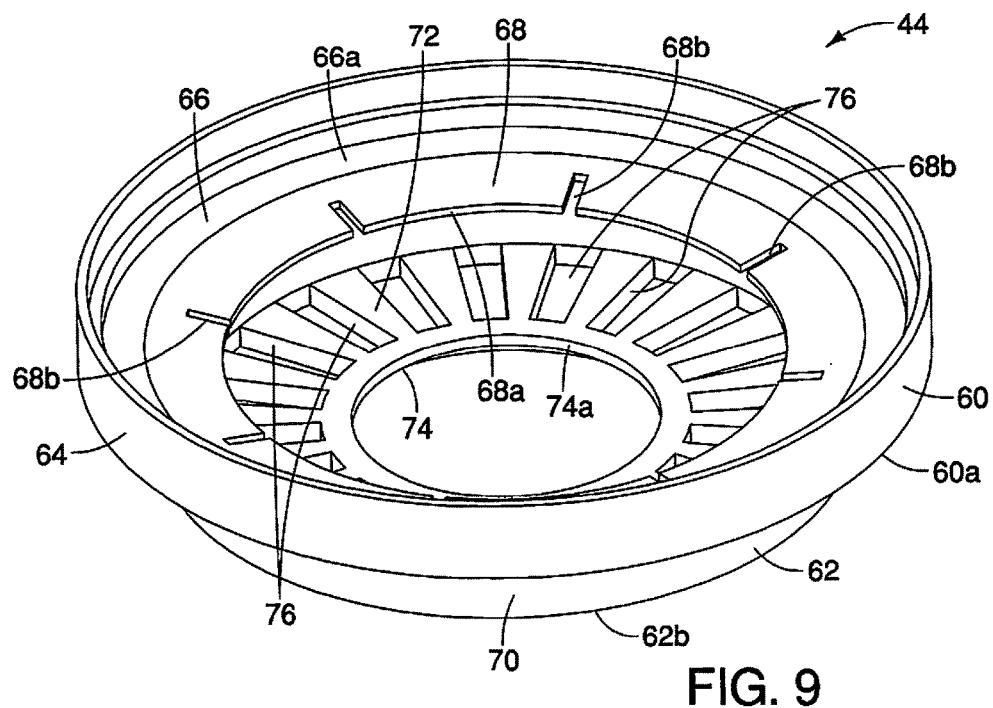
FIG. 9 is a top perspective view of the filter member shown removed from the vehicle in accordance with the first embodiment.
Figure 12:
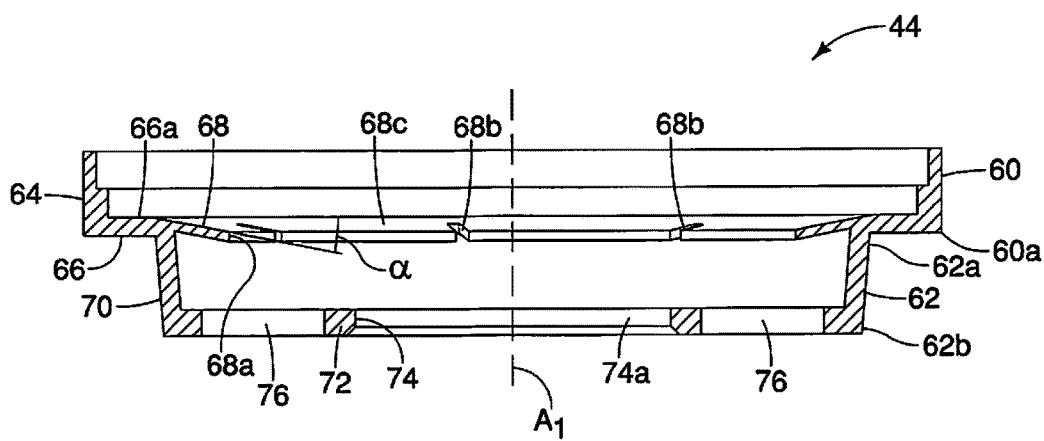
FIG. 12 is a side cross-sectional view of the filter member taken along the line 12-12 in FIG. 7 in accordance with the first embodiment.

As shown in FIGS. 7, 9 and 12, the first radially inwardly extending portion 68 includes a plurality of relieve slots 68b. The slots 68b provide the first radially inwardly extending portion 68 with flexibility. As shown in FIG. 12, the first radially inwardly extending portion 68 of the first portion 60 has a conical shape such that an upper surface 68c thereof defines an obtuse angle $\alpha_1$ relative to the planar surface 66a of the annular step portion 66 (see FIG. 12).

As shown in FIG. 4, the inner annular edge 68a of the first radially inwardly extending portion 68 is dimensioned to contact the outer surface of the cylindrically shaped projection 50 of the support panel 26, thereby preventing the ingress of water and debris between the first portion 60 of the filter member 44 and the cylindrically shaped projection 50 of the support panel 26.

Figure 6:
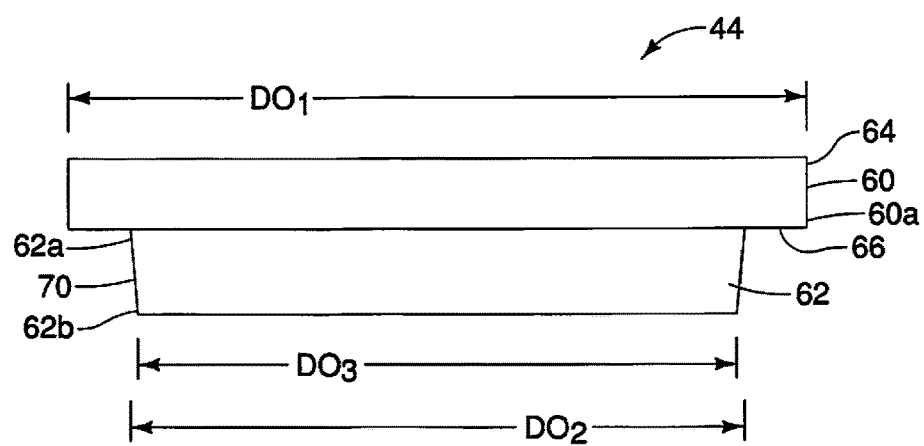
FIG. 6 is a side view of the filter member shown removed from the vehicle in accordance with the first embodiment.
Figure 8:
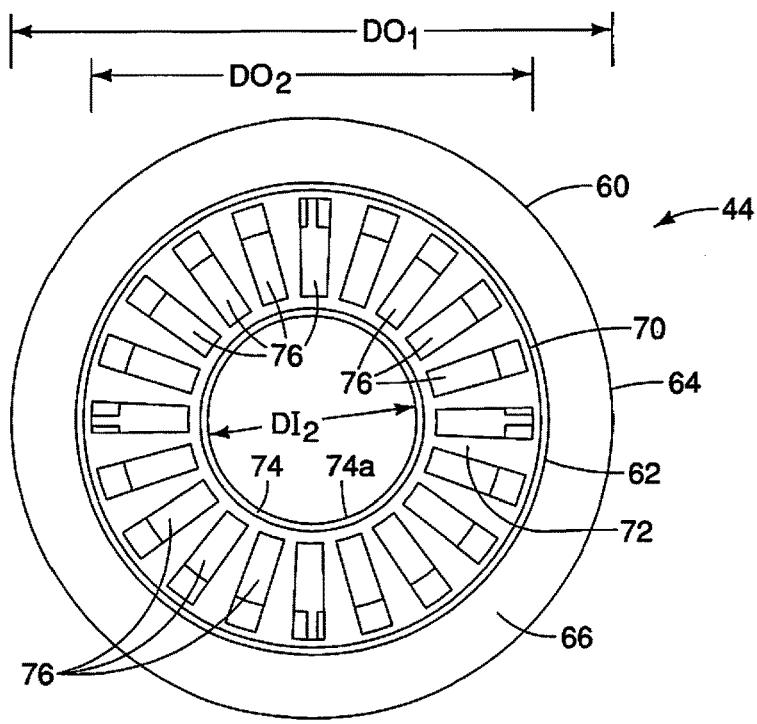
FIG. 8 is a bottom view of the filter member shown removed from the vehicle in accordance with the first embodiment.
Figure 10:
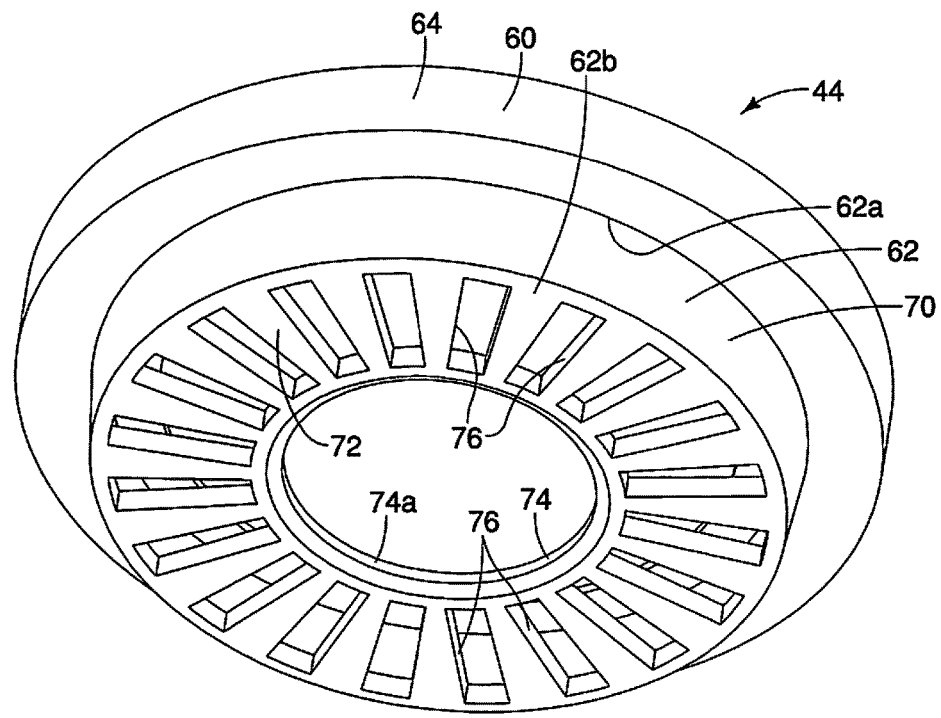
FIG. 10 is a bottom perspective view of the filter member shown removed from the vehicle in accordance with the first embodiment.

As shown in FIGS. 6, 8 and 10, the second portion 62 defines a second outer annular surface 70. The upper end 62a of the second outer annular surface 70 has a second outer diameter $DO_2$ smaller than the first outer diameter $DO_1$. A lower end 62b of the second outer annular surface 70 has a third outer diameter $DO_3$ that is smaller than the second outer diameter $DO_2$. Hence, the second outer annular surface 70 has a conical shape but has the appearance of having an overall cylindrical shape. As shown in FIG. 4, the second portion 62 is partially inserted into the conical shaped portion 42c of the water diverting member 42. Hence, the second outer annular surface 70 contacts and engages the inwardly facing surface of the upper area of the conically (or cylindrically) shaped portion 42c of the water diverting member 42.

The second portion 62 has a second radially inwardly extending portion 72 defining an annular wall 74 with an inner annular surface 74a. The inner annular surface 74a defines a second inner diameter $DI_2$ smaller than the first inner diameter $DI_1$. Further, the first inner diameter $DI_1$ is smaller than the second outer diameter $DO_2$. The second radially inwardly extending portion 72 includes a plurality of drainage openings 76 located radially outward of the inner annular surface.

As shown in FIG. 4, the inner annular surface 74a is dimensioned to snuggly fit around the first shaft housing 36, just above the conical shaped portion 42c of the water diverting member 42.

Further, the cylindrically shaped projection 50 of the support panel 26 extends downward from the lower surface 26b of the support panel 26 into the filter member 44, as is also shown in FIG. 4. As mentioned above, the inner annular edge 68a of the first portion 60 of the filter member 44 contacts the outer surface of the cylindrically shaped projection 50 of the support panel 26. Consequently, when water and debris flow through the cylindrically shaped projection 50 of the support panel 26, water is able to flow into the filter member 44, through the drainage openings 76, and then out the water draining openings 42e of the water diverting member 42. Debris, on the other hand, is trapped within the filter member 44. Hence, the filter member 44 is mounted to the water diverting member 42 and to the shaft housing 36 of the wiper drive mechanism 14, and is shaped and dimensioned to allow flow of water from the first shaft opening 26c through the drainage openings 76 but restrict flow of debris.

Figure 11:
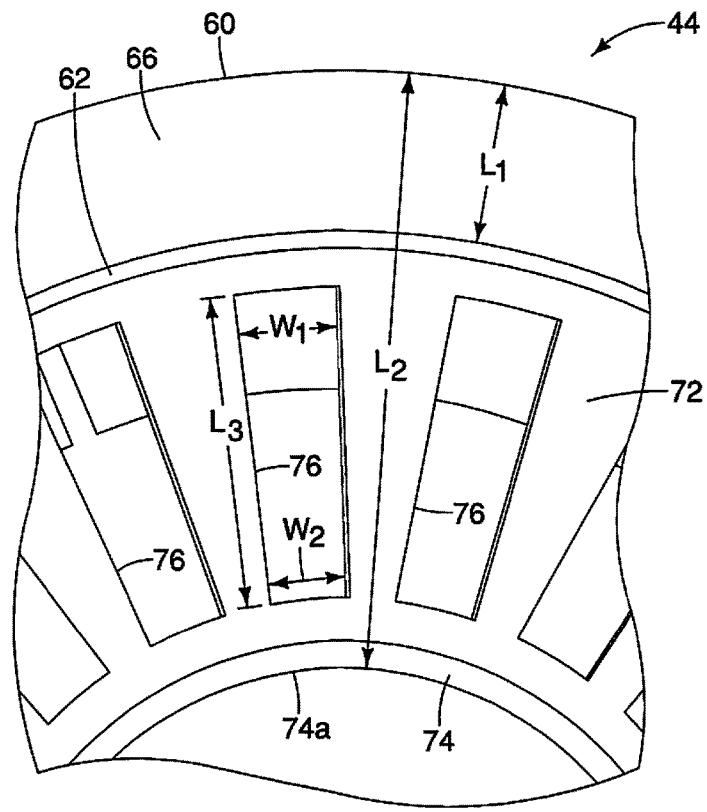
FIG. 11 is a bottom view of a portion of the filter member showing drain holes formed therein in accordance with the first embodiment.

As shown in FIG. 11, the first portion 60 has a length $L_1$ measured from the first outer annular surface 64 to the second outer annular surface 70 in a radial direction, where the radial direction is a direction extending radially outward from a central axis Ai of the filter member 44. The entire filter member 44 has an overall length $L_2$ in the radial direction measured from the first outer annular surface 64 to the inner annular surface 74a. Further, each of the drainage openings 76 has an overall length $L_3$ measured in the radial direction. The overall length $L_3$ is greater than the length $L_1$. In the depicted embodiment, the overall length $L_3$ is twice the length $L_1$. However, the overall length $L_3$ can be any length that ranges between being equal to the length $L_1$ or being up to three times the size of the length $L_1$.

Further, each of the drainage openings 76 has a tapering width. At a radially outward end thereof, each of the drainage openings 76 has a first width $W_1$ and an a radially inward end thereof, each of the drainage openings 76 has a second width $W_2$ that is 25% less than the first width $W_1$. The difference between the first width $W_1$ and the second width $W_2$ can vary by anywhere from 10% to 40% depending upon the overall dimensions and shape of the filter member 44.

As shown in cross-section in FIG. 12, the filter member 44 is a single, unitary, monolithic element. The filter member 44 can be molded in a single molding process, or can be assembled from a plurality of different elements that are welded or heat melted to one another.

The vehicle body structure elements and the wiper drive mechanism are conventional components that are well known in the art. Since such structures are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle windshield wiper assembly. Accordingly, these terms, as utilized to describe the present invention should be interpreted relative to a vehicle equipped with the vehicle windshield wiper assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle windshield wiper assembly, comprising
a vehicle body structure defining a windshield opening and a wiper drive receiving area beneath the windshield opening;
a support panel adjacent to the windshield opening, the support panel having an upper surface and a lower surface with a first shaft opening extending from the upper surface to the lower surface;
a wiper drive mechanism supported to the vehicle body structure and extending along the lower surface of the support panel, the wiper drive mechanism including a shaft housing and a wiper shaft rotationally supported within the shaft housing;
a water diverting member at least partially covering a portion of the wiper drive mechanism, encircling the shaft housing and being attached thereto, the water diverting member having a cylindrically shaped portion extending upward therefrom, the cylindrically shaped portion defining a second shaft opening with the shaft housing and wiper shaft extending upward through the second shaft opening and further extending upward through the first shaft opening; and
a filter member mounted to a radially inwardly facing surface of an upper area of the cylindrically shaped portion of the water diverting member and below portions of the support panel, the filter member encircling the shaft housing and being shaped and dimensioned to allow flow of water from the first shaft opening therethrough and restrict flow of debris from the first shaft opening therethrough.

2. The vehicle windshield wiper assembly according to claim 1, wherein
the filter member has an overall annular disk-shape with a first portion defining a first outer annular surface having a first outer diameter and a second portion defining a second outer annular surface having a second outer diameter smaller than the first outer diameter, with the second outer annular surface contacting the inwardly facing surface of the upper area of the cylindrically shaped portion of the water diverting member.

3. The vehicle windshield wiper assembly according to claim 2, wherein
the first portion having a first radially inwardly extending portion that defines an inner annular edge having a first inner diameter, and
the second portion having a second radially inwardly extending portion defining an annular wall with an inner annular surface having a second inner diameter smaller than the first inner diameter.

4. The vehicle windshield wiper assembly according to claim 3, wherein
the first inner diameter is smaller than the second outer diameter.

5. The vehicle windshield wiper assembly according to claim 3, wherein
the first radially inwardly extending portion includes a plurality of relieve slots such that the first radially inwardly extending portion is flexible.

6. The vehicle windshield wiper assembly according to claim 3, wherein
the second radially inwardly extending portion includes a plurality of drainage openings located radially outward of the inner annular surface.

7. The vehicle windshield wiper assembly according to claim 3, wherein
the first portion includes an annular step portion that extends from a lower end of the first portion to an upper end of the second portion, the annular step portion defining a planar surface.

8. The vehicle windshield wiper assembly according to claim 7, wherein
the first radially inwardly extending portion of the first portion of the filter member has a conical shape such that an upper surface thereof defines an obtuse angle relative to the planar surface of the annular step portion.

9. The vehicle windshield wiper assembly according to claim 3, wherein
the support panel includes a cylindrically shaped projection that extends downward from the lower surface of the support panel with the first shaft opening being defined at a bottom end of the cylindrically shaped protrusion, and
the inner annular edge of the first radially inwardly extending portion contacts an outer surface of the bottom end of the cylindrically shaped protrusion.

10. The vehicle windshield wiper assembly according to claim 1, wherein
the filter member is a single, unitary, monolithic element.

* * * * *